United States Patent [19]

Maeshima

[11] Patent Number: 4,994,913
[45] Date of Patent: Feb. 19, 1991

[54] STILL PICTURE TRANSMISSION-DISPLAY APPARATUS

[75] Inventor: Kazuya Maeshima, Nagasaki, Japan

[73] Assignee: Mitsubishi Denki Kabushiki Kaisha, Tokyo, Japan

[21] Appl. No.: 431,079

[22] Filed: Nov. 3, 1989

[30] Foreign Application Priority Data

Nov. 8, 1988 [JP] Japan .................. 63-283016

[51] Int. Cl.⁵ .................................. H04N 7/004
[52] U.S. Cl. .................................... 358/142; 358/133
[58] Field of Search ............... 358/148, 147, 146, 142, 358/141, 133, 134, 137; 379/53, 100; 364/521, 524

[56] References Cited

U.S. PATENT DOCUMENTS 4,872,054 10/1989 Gray et al. .......................... 358/148

FOREIGN PATENT DOCUMENTS 54-117622  9/1979  Japan .
61-194992  8/1986  Japan .
0263982 10/1988  Japan .
2173675 10/1986  United Kingdom .................. 379/53

Primary Examiner—James J. Groody
Assistant Examiner—David E. Harvey
Attorney, Agent, or Firm—Burns, Doane, Swecker & Mathis

[57] ABSTRACT

A still picture transmission-display apparatus which encodes at a transmission side display timing of inputted analog still picture data so as to transmit to a receiving side the display timing code and digital still picture data obtained by digital-converting the analog still picture data and which decodes at the receiving side the display timing code so as to set parameters of the display timing at a controller, the controller, according to the parameters, controlling outputs of the still picture data and horizontal and vertical synchronizing signals to a display device. Then, still picture data of various timing can be transmitted.

10 Claims, 4 Drawing Sheets

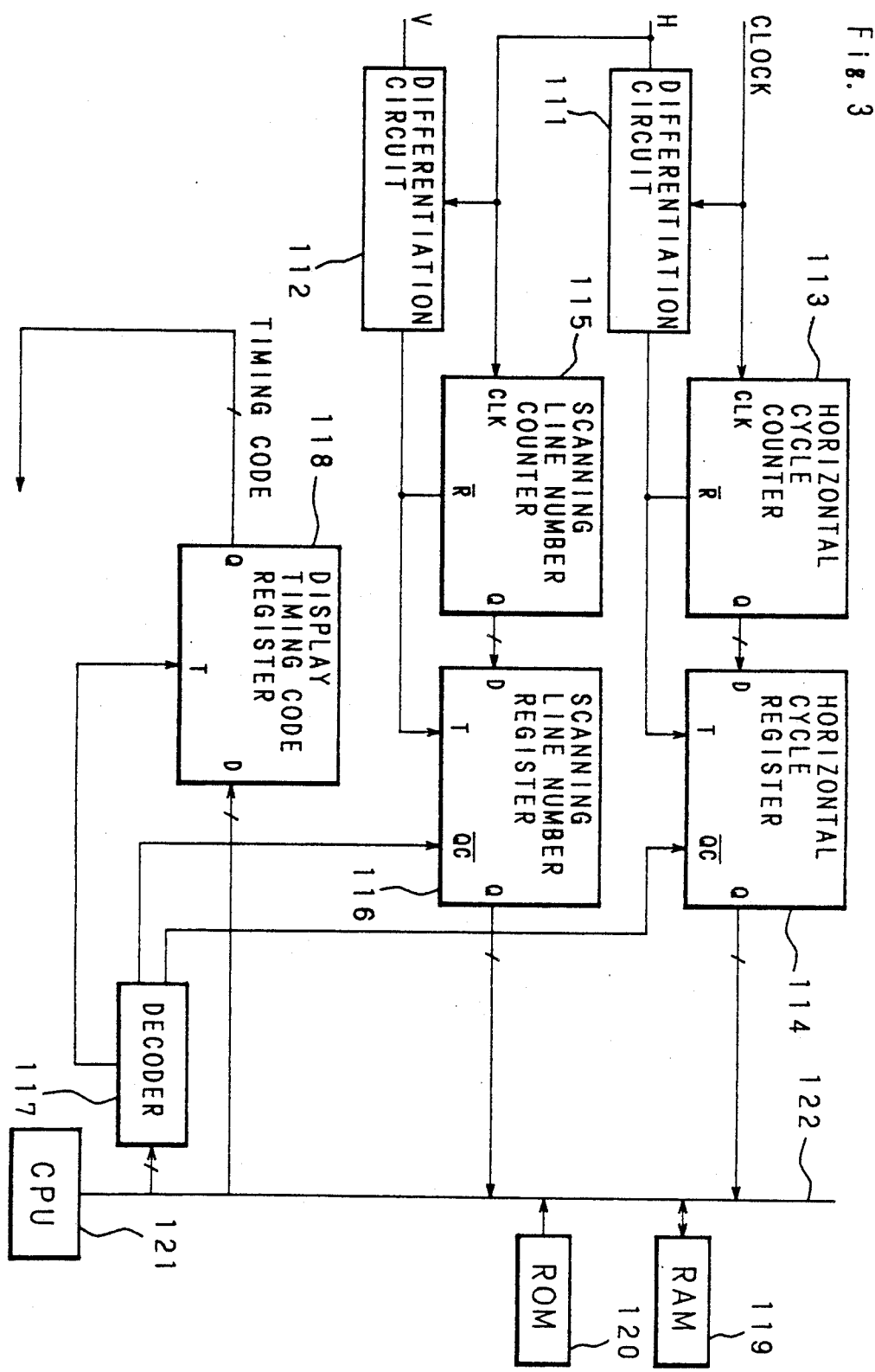

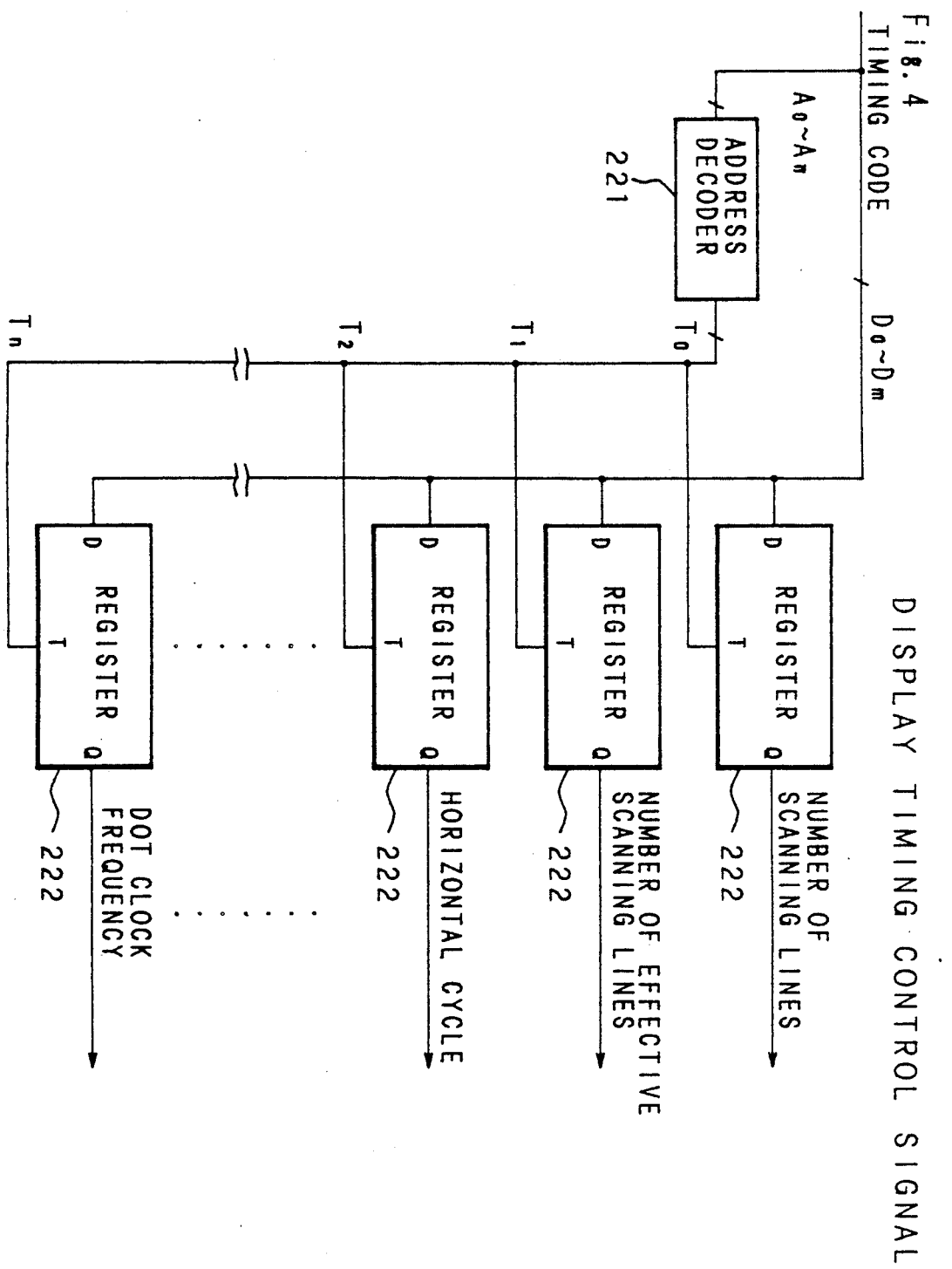

STILL PICTURE TRANSMISSION-DISPLAY APPARATUS

BACKGROUND OF THE INVENTION

1. Field of the Invention

The present invention relates to a still picture transmission-display apparatus for speed-changing, transmitting and displaying still picture data.

2. Description of Related Art

FIG. 1 is a block diagram of a still picture transmission-display apparatus of the conventional storage conversion type speed changing system.

At the transmission side of this apparatus are provided an analog/digital (A/D) converter 1 which converts into digital still picture data analog still picture data, such as R.G.B. video signals, obtained by a usual video camera or by a graphic board of personal computers, a frame memory 2 for storing therein digital still picture data corresponding to one picture pane of cathode ray tube (CRT), a write timing generator 3 for generating a sampling clock Cl1 for the A/D converter 1 and a write control signal S1 for the frame memory 2 on the basis of a horizontal synchronizing signal H and a vertical synchronizing signal V, a transmission timing generator 4 for generating a read control signal S2 and a transmission timing signal S3 for the frame memory 2 on the basis of the horizontal and vertical synchronizing signals H and V, and a multiplex transmission unit 5 for multiplex-transmitting the digital still picture data to the receiving side.

At the receiving side connected to the transmission side of such construction through a transmission line 14 are provided a receiving/regenerating unit 6 for receiving and regenerating the digital still picture data transmitted through the transmission line 14, a frame memory 7 for storing therein the digital still picture data corresponding to one picture plane of CRT, a digital-/analog (D/A) converter 8 for converting into analog still picture data the digital still picture data read out from the frame memory 7, and a CRT controller 9 for generating a read control signal S4 for the frame memory 7, Sampling clock CL2 for the D/A converter 8, and the horizontal synchronizing signal H and vertical synchronizing signal V to CRT (not shown).

Next, explanation will be given on operation of the apparatus.

At the transmission side, the inputted analog still picture data is converted into digital still picture data by the A/D converter 1 according to the clock CL1 from the generator 3 and the digital still picture data corresponding to one picture plane is written into the frame memory 2 in synchronism with the control signal S2 from the generator 3, wherein the generator 3 generates the clock CL1 and control signal S1 on the basis of the inputted synchronizing signals H and V of analog still picture data, whereby the digital still picture data corresponding to one picture plane is written in the rear time into the frame memory 2 in synchronizing with the synchronizing signals of analog still picture data, the digital still picture data written in the frame memory 2 is read out from the frame memory 2 in synchronism with the control signal S3 from the generator 4, multiplexed according to a protocol at the multiplex transmission unit 5, and sent out to the transmission line 14 in accordance with the timing signal S3 from the generator 4.

A the receiving side, the digital still picture data corresponding to one picture plane transmitted through the transmission line 14 is multiplex-separated and regenerated by the receiving/regenerating unit 6 according to the protocol so as to be written into the frame memory 7 according to a write control signal S5 from the receiving/regenerating unit 6. The digital still picture data in synchronism with the display timing is repeatedly read out from the frame memory 7 according to the control signal S4 from the analog still picture data, for example, R.G.B. video signals, in accordance with clock CL2 from the controller 9 and outputted from the D/A converter 8.

The analog still picture data thus obtained is supplied together with the synchronizing signals H and V to CRT and displayed thereby.

Since the conventional still picture transmission-display apparatus is constructed as above-mentioned, the problem is created in that the still picture data only of one kind of the timing specified by the transmission timing generator 4 can be transmitted.

In addition, in the Japanese patent application Laid-Open No. 54-117622, it is disclosed that an image signal from a television camera different in system is received and the line number in the image signal in one field or one frame thereof is counted, thereby automatically discriminating the image signal system and following thereto the circuit operation. This system, however, can correspond only to an image signal different on the line number and directly inputted from a video camera or the like, so that, when the transmission data adopt various systems, the system cannot directly correspond thereto. Also, the Japanese Patent Application Laid-Open No. 61-194992 disclosed the apparatus which identifies the kind of a usual television signal, a video input signal and an R.G.B. external input signal, so as to automatically switch the mode of television receive. Such apparatus, however, is not applicable directly to the image transmission.

SUMMARY OF THE INVENTION

The present invention has been designed in order to solve the above problem. A still picture transmission-display apparatus oft he present invention is provided at the transmission side with an automatic follow-up write timing generator for automatically generating a sampling clock for an A/D converter and a write control signal for a frame memory corresponding to the inputted analog still picture data and with a display timing encoder for generating a display timing code from the horizontal synchronizing signal and vertical synchronizing signal of the analog still picture data, and at the receiving side with a display timing decoder for decoding the transmitted display timing code and with a settable controller for setting various display timing in accordance with a display timing control signal from the display timing decoder so s to be capable of generating a read control signal for a frame memory, the sampling clock for a D/A converter, and the horizontal synchronizing signal and vertical synchronizing signal to a display device.

An object of the invention is to provide a still picture transmission-display capable of transmitting the still picture data of various display timing.

Another object of the invention is to provide a still picture transmission-display apparatus which, even when any type of analog still picture data is inputted at the transmission side, can convert the display timing at the receiving side, thereby enabling a desired image to be regenerated.

The above and further objects and features of the invention will more fully be apparent from the following detailed description with accompanying drawings.

BRIEF DESCRIPTION OF THE DRAWINGS

FIG. 3 is a block diagram of a display timing encoder, and FIG. 4 is a block diagram of a display timing decoder.

DESCRIPTION OF THE PREFERRED EMBODIMENTS

Figure 1:
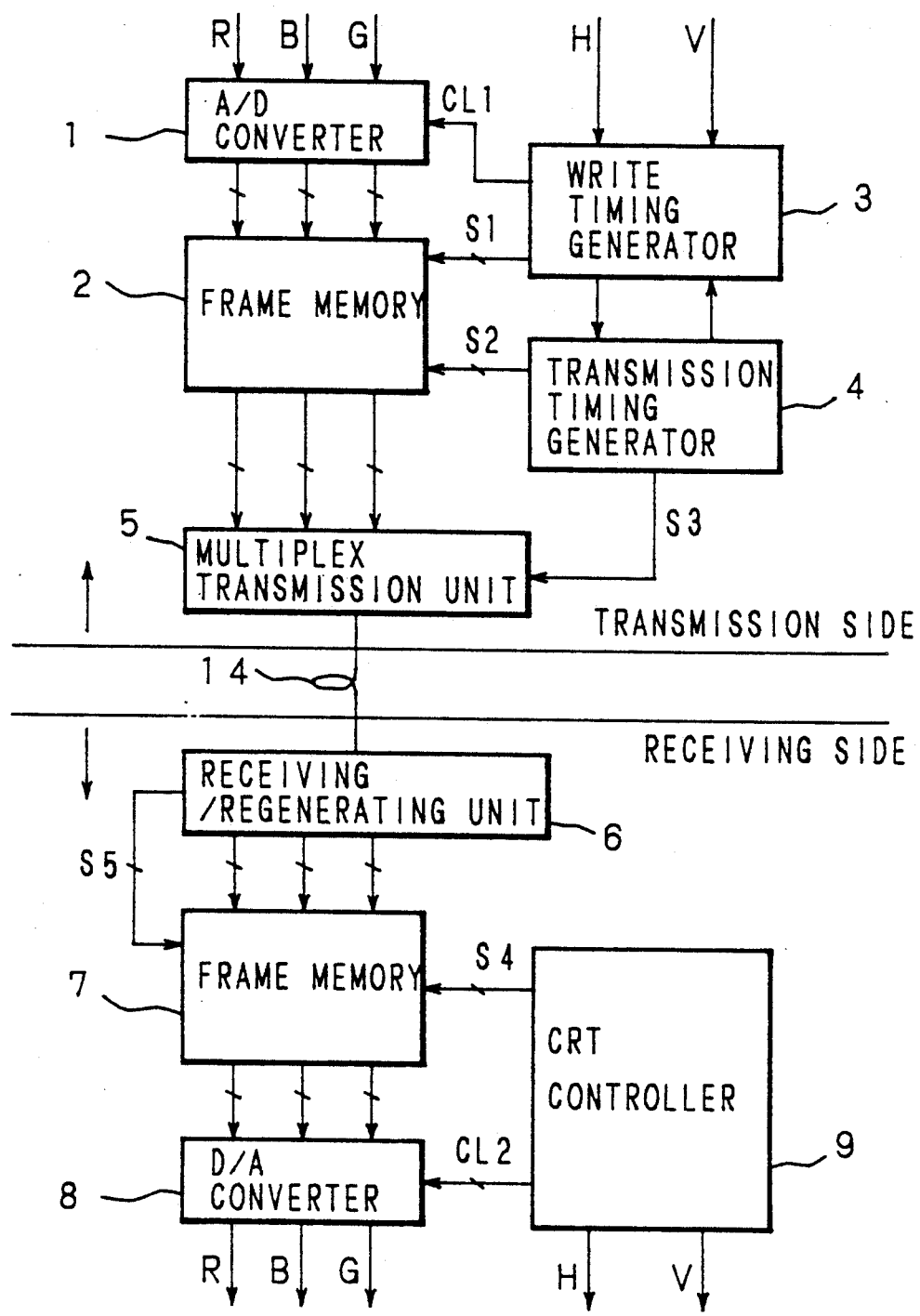
FIG. 1 is a block diagram of the conventional still picture transmission-display apparatus.
Figure 2:
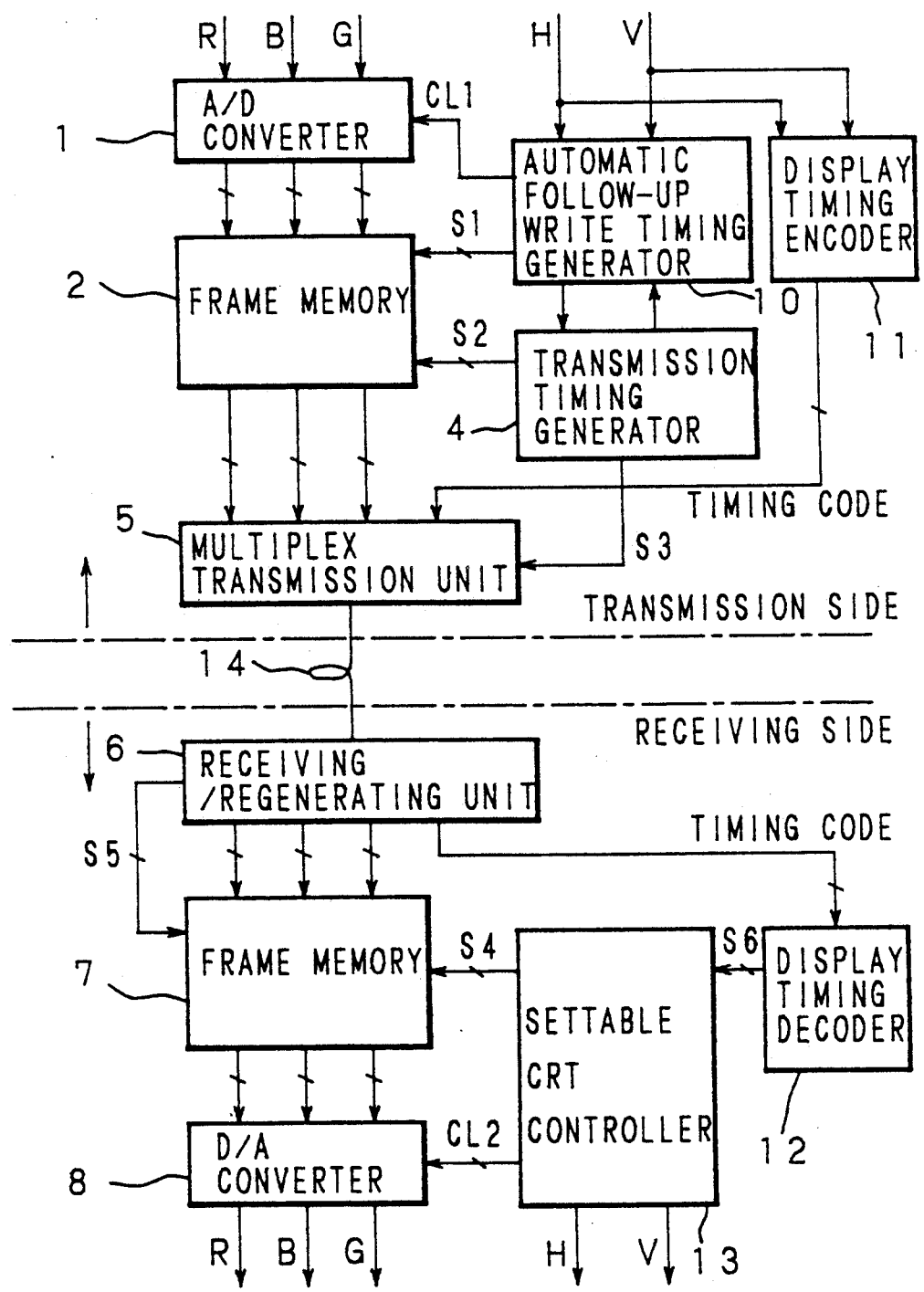
FIG. 2 is a block diagram of an embodiment of a still picture transmission-display apparatus of the present invention.

Referring to FIG. 2, the still picture transmission-display apparatus of the invention is provided at the transmission side with an A/D converter 1 for converting into digital still picture data analog still picture data, such as R.G.B. video signals, obtained by a usual video camera or by a graphic board of person computers, a frame memory 2 for storing therein digital still picture data corresponding to one picture plane of CRT, a transmission timing generator 4 for generating a read control signals S2 and a transmission timing signal S3 for the frame memory 2 on the basis of the horizontal synchronizing signal H and vertical synchronizing signal V, a multiplex transmission unit 5 for multiplex-transmitting the digital still picture data to the receiving side, an automatic follow-up write timing generator 10 for automatically generating a sampling clock CL1 for the A/D converter 1 corresponding to the horizontal frequency of the inputted analog still picture data and a write control signal S1 for the frame memory 2 corresponding to the scanning line structure of the data, and a display timing encoder 11 for encoding the display timing on the basis of the horizontal synchronizing signal H and vertical synchronizing signal V so as to output the display timing code to the multiplex transmission unit 5. In addition, the display timing code comprises address of the respective timing parameter and the parameter data.

FIG. 3 is a block diagram of a display timing encoder 11. The encoder 11 has a differentiation circuit 111 for differentiating the horizontal synchronizing signal H, a differentiation circuit 112 for differentiating the vertical synchronizing signal V, a horizontal cycle counter 113 for counting a reference clock in one horizontal scanning period, a horizontal cycle register 114 for holding the horizontal cycle, a scanning line number counter 115 for counting the horizontal synchronizing signal in one field, a scanning line number register 116 for holding the total scanning line number, a decoder 117 for decoding the horizontal cycle and scanning line number from the registers 114 and 115 to a CPU bus 122, a display timing code register 118 for holding the display timing code, a RAM 119 and a ROM 120 for storing therein the display parameters for the still picture data, and a central processing unit (CPU) 121 for controlling operation of the apparatus.

At the receiving side connected to the transmission side through a transmission line 114 are provided a receiving/regenerating unit 6 for receiving and regenerating the digital still picture data transmitted through the transmission line 14, a frame memory 7 for storing therein the digital still picture data corresponding to one picture plane of CRT, a D/A converter 8 for converting the digital still picture data read out from the frame memory 7 into analog still picture data and outputting said data, a display timing decoder 12 for decoding the transmitted display timing code, and a settable CRT controller 13 for outputting a read control signal S4 to the frame memory 7, a sampling clock CL2 to the D/A converter 8, and the horizontal synchronizing signal H and vertical synchronizing signal V to CRT (not shown) according to the parameters of the set display timing.

FIG. 4 is a block diagram of the display timing decoder 12, which has an address decoder 221 for decoding addresses $A_0$ through $A_n$ of the display timing parameters, and a plurality of registers 222 for fetching the respective parameters data $D_0$ through $D_m$ and outputting the parameter data as the display timing control signal to the controller 13, Next, explanation will be given on operation of the apparatus.

The inputted analog still picture data is converted by the A/D converter 1 into the digital still picture data according to the clock CL1 from the generator 10 so that the digital still picture data corresponding to one picture plane of CRT synchronizes with the control signal S1 from the generator 10 to be written into the frame memory 2. The generator 10 generates the clock CL1 and control signal S1 on the basis of the synchronizing signals H and V of the inputted analog still picture data, whereby the digital still picture data corresponding to one picture plane synchronizes with the synchronizing signals of analog still picture data so at to be written in a real time into the frame memory 2. The digital still picture data written in the frame memory 2 synchronizes with the control signal S2 from the generator 4 to be read out from the frame memory 2 to the multiplex transmission unit 5.

At the encoder 11, the display parameters required to set the display timing at the controller 13 at the receiving side is encoded by the predetermined method on the basis of horizontal synchronizing signal H and vertical synchronizing signal V. The counter 113 counts pulse of reference clock within one horizontal scanning period to thereby detect the horizontal cycle, the detected horizontal cycle being held in the register 114. The counter 115 counts the horizontal synchronizing signal in one field so as to detect the total scanning line number in one field, the detected total number being held in the register 116. The CPU 121 discriminates an inputted signal and the display parameters corresponding thereto are read out from RAM 119 or ROM 120 to the bus 122. The read-out display parameters are encoded together with addresses according to the protocol, the generated display timing code being held int he register 118. The obtained display timing code is multiplexed at the multiplex transmission unit 5, with the digital still picture data corresponding to one picture plane read out from the frame memory 2 in accordance with the protocol and delivered to the transmission line 14 in accordance with the timing signal S3.

At the receiving side, the multiplex-transmitted digital still picture data corresponding to one picture plane, and display timing code, are separated to be regenerated at the receiving/regenerating unit 6 according to the protocol, also that the digital still picture data corresponding to one picture plane is written into the frame memory 7 in accordance with a write control signal S5 from the receiving/regenerating unit 6. The decoder 12 decodes the display timing code and outputs a display timing control signal S6. The decoder 221 decodes each address of display timing parameters, so that the respective parameter data are fetched to the respective registers 222, the parameter data being outputted as the display timing signal to the controller 13. The display timing control signal includes data, such as the number of scanning lines, number of effective horizontal dots, dot clock frequency, vertical back porch, and horizontal back porch.

The control signal S6 sets the display parameters at the controller 13. The controller 13 outputs the control signal S4 to the frame memory 7, the clock CL2 to the D/A converter 8, and the horizontal synchronizing signal H and vertical synchronizing signal V to CRT (not shown), in accordance with the set display parameters. The digital still picture data is repeatedly read out from the frame memory 7 in accordance with the control signal S4 and converted by the D/A converter 8 into the analog still picture data, such as R.G.B. video signals, and then outputted. The obtained analog still picture data is supplied together with the synchronizing signals H and V from the controller 13 to CRT and displayed thereby.

As seen from the above, the still picture transmission-display apparatus of the present invention, even when any type of analog still picture data is inputted to the transmission side, can convert the data by the display timing at the receiving side, thereby enabling a desired image to be regenerated.

At the embodiment of the invention, all the display parameters are annexed with respective addresses for transmission, but the display parameters may be transmitted always in the predetermined order and the parameter data at the receiving side may be fetched to the predetermined register in the predetermined order. Thus, there is no need that all the display parameters are accompanied by respective addresses.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds therefore are therefore intended to be embraced by the claims.

What is claimed is:

1. A still picture transmission-display apparatus comprising;

an analog/digital converter for converting inputted analog still picture data of raster scanning type into digital still picture data;

a first memory for storing therein said digital still picture data converted by said analog/digital converter;

signal generating means for generating a sampling clock for said analog/digital converter and a write control signal for said first memory corresponding to said analog still picture data;

an encoder for encoding display timing of said analog still picture data so as to output a display timing code;

transmission means for transmitting to a receiving side the digital still picture data read out from said first memory and the display timing code outputted from said encoder;

a second memory for storing therein the digital still picture data transmitted by said transmission means;

a digital/analog converter for converting into analog still picture data the digital still picture data read out from said second memory;

a decoder for decoding the display timing code transmitted by said transmission means so at to generate a display timing control signal; and a controller for setting various display timing on the basis of said display timing control signal so at to generate a read control signal for controlling read-out from said second memory, a sampling clock for said digital/analog converter, and a horizontal synchronizing signal and a vertical synchronizing signal to a display device.

2. A still picture transmission-display apparatus according to claim 1, wherein said signal generating means generates said sampling clock for said analog/digital converter corresponding to the horizontal frequency of said analog still picture data.

3. A still picture transmission-display apparatus according to claim 1, wherein said signal generating means generates said write control signal corresponding to scanning line structure of said analog still picture data.

4. A still picture transmission-display apparatus according to claim 1, wherein said encoder encodes the display timing on the basis of a horizontal synchronizing signal and a vertical synchronizing signal of said analog still picture data.

5. A still picture transmission-display apparatus according to claim 1, wherein said display timing control signal sets display parameters at said controller, said controller generating said read control signal, sampling clock horizontal synchronizing signal and vertical synchronizing signal, according to said display parameters.

6. A still picture transmission-display apparatus according to claim 1, wherein said transmission means multiplexes said digital still picture data and display timing code and transmits them to the receiving side.

7. A still picture transmission-display apparatus according to claim 6, further comprising means for separating and regenerating said digital still picture data and display timing code multiplex-transmitted by said transmission means.

8. A still picture transmission-display apparatus according to claim 1, wherein said digital/analog converter outputs said analog still picture data to the display device, said controller outputting said horizontal synchronizing signal and vertical synchronizing signal to said display device.

9. A still picture transmission-display apparatus according to claim 8, wherein said first and second memories store therein digital still picture data corresponding to one picture plane of said display device.

10. A still picture transmission-display apparatus according to claim 8, wherein said display device has a cathode ray tube.

* * * * *